(12) United States Patent
Nocker, IV

(10) Patent No.: US 6,236,486 B1
(45) Date of Patent: May 22, 2001

(54) DATA COMMUNICATION SYSTEM FOR PRINTER AND HANDHELD COMPUTER

(75) Inventor: William B. Nocker, IV, Marysville, WA (US)

(73) Assignee: Intermec IP Corp., Woodland Hills, CA (US)

( * ) Notice: Subject to any disclaimer, the term of this patent is extended or adjusted under 35 U.S.C. 154(b) by 0 days.

(21) Appl. No.: 08/986,003

(22) Filed: Dec. 5, 1997

(51) Int. Cl.[7] .............................. H04B 10/00; B41J 3/36; B41J 3/39
(52) U.S. Cl. .............................. 359/159; 359/163; 400/88
(58) Field of Search ................................ 359/159, 163; 400/88; 385/88

(56) References Cited

U.S. PATENT DOCUMENTS

| | | | |
|---|---|---|---|
| D. 340,946 | 11/1993 | Kobayashi | D18/55 |
| 5,186,558 | 2/1993 | Sherman et al. | 400/692 |
| 5,317,691 | 5/1994 | Traeger | 359/200 |
| 5,320,437 | 6/1994 | Malke et al. | 400/605 |
| 5,347,115 | 9/1994 | Sherman et al. | 235/472 |
| 5,466,170 | 11/1995 | Pavek | 439/374 |
| 5,484,991 | 1/1996 | Sherman et al. | 235/472 |
| 5,503,483 * | 4/1996 | Petteruti et al. | 400/88 |
| 5,515,303 * | 5/1996 | Cargin, Jr. et al. | 364/708.1 |
| 5,519,527 * | 5/1996 | Panton | 359/159 |
| 5,520,470 * | 5/1996 | Willett | 400/88 |
| 5,531,532 | 7/1996 | Umbach | 400/692 |
| 5,561,727 * | 10/1996 | Akita et al. | 385/88 |
| 5,598,543 * | 1/1997 | Notarianni et al. | 359/309 |
| 5,734,328 * | 3/1998 | Shinbori | 340/825.06 |
| 5,786,921 * | 7/1998 | Wang et al. | 359/152 |
| 5,857,065 * | 1/1999 | Suzuki | 395/114 |
| 5,877,882 * | 3/1999 | Green et al. | 359/163 |
| 5,912,752 * | 6/1999 | Mollett et al. | 359/137 |

\* cited by examiner

Primary Examiner—Leslie Pascal
Assistant Examiner—Dalzid Singh
(74) Attorney, Agent, or Firm—O'Melveny & Myers LLP

(57) ABSTRACT

A data communication system permits optical communication between a printer and a handheld data-collection computer. The printer has a receiving cavity disposed at an outer surface thereof with a first optical communication port disposed on at least one surface of the receiving cavity. The first optical communication port is coupled to the printer to permit data communications therewith. The data-collection computer has a second optical communication port disposed at an outer surface thereof. The second optical communication port is coupled to the computer to permit data communications therewith. The computer is adapted for partial insertion into the receiving cavity to bring the first optical communication port into partial alignment with the second optical communication port, thereby enabling data communication over an optical medium between the first and second optical communication ports to permit direct data communication between the printer and the computer.

19 Claims, 4 Drawing Sheets

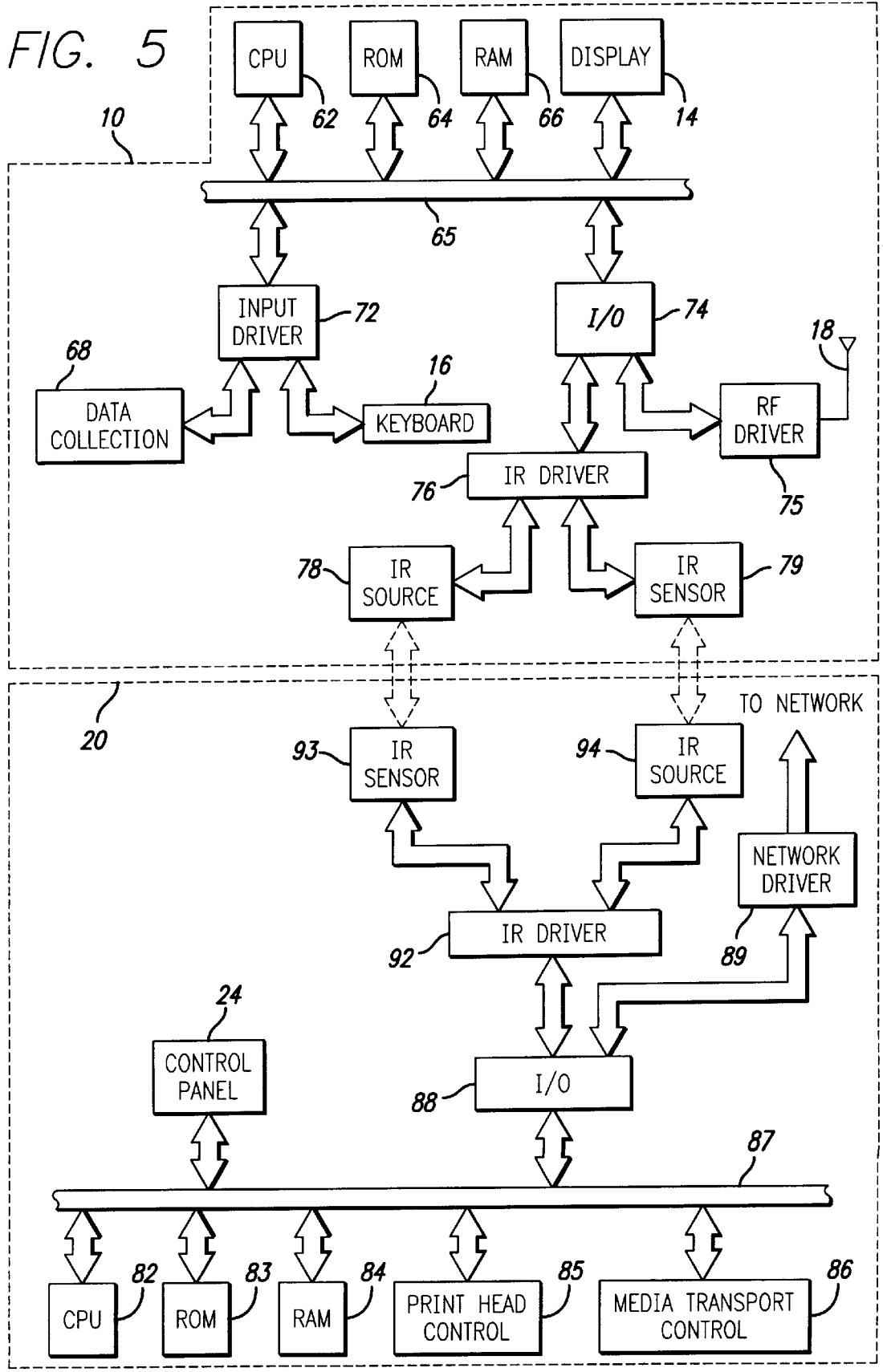

DATA COMMUNICATION SYSTEM FOR PRINTER AND HANDHELD COMPUTER

BACKGROUND OF THE INVENTION

1. Field of the Invention

The present invention relates to wireless local area networks including handheld computers that communicate with each other and with central computers using RF communications signals, and more particularly, to an optical interface provided on a printer and on a handheld computer to permit direct data communication therebetween as well as wireless communication between the printer and other elements of the wireless local area network.

2. Description of Related Art

In the automated identification and data capture industry, it is known to operate a wireless local area network (LAN) that includes a plurality of handheld data-collection terminals that communicate over a radio frequency (RF) channel with a central host computer. The data-collection terminals enable an operator to scan and decode data that may be encoded in the form of a one or two-dimensional bar code symbology. The decoded information is then transmitted back to the central host computer across the RF channel. Such wireless LAN systems are particularly well suited to data capture applications as diverse as process and inventory control, time and attendance monitoring, security management, customer service and point of sale recording, shipping and receiving record keeping, and warehouse operations.

The handheld data-collection terminals generally have limited functionality in order to keep their size, weight and cost to a minimum. In recent years, however, the availability of high performance microprocessors and other integrated electronic systems has driven a demand for more sophisticated data-collection terminals which have all the power of personal computers in a palm-sized package. These data-collection computers may include integrated scanning systems using charge-coupled device (CCD) elements to form a memory-mapped image of a region of interest, as well as advanced processing capability to locate, orient and decode the memory-mapped image into the information that corresponds to the bar code symbol. For example, the higher processing power of the data-collection computers permits better error correction, enabling collection of bar code symbols having readability problems, such as a torn, soiled or partially obliterated bar code symbol. As a result, the data-collection computers are better able to decode bar code symbols than the less sophisticated data-collection terminals.

The wireless LAN may further include one or more printers for producing bar code labels used in identifying items that are tracked in a particular data capture application. In order for the data-collection terminal to accurately read the bar code symbol, it is essential that the symbol be printed in a high quality manner, without any streaking, blurring or improper registration of the symbols to the labels. At the same time, it is essential that the adhesive backing layer of the labels not be damaged by heat generated during the printing process. In view of the demanding printing requirements, bar code symbols are often printed using direct thermal or thermal transfer printing techniques, referred to collectively herein as thermal printing. To achieve maximum data throughput, dedicated thermal printers are generally coupled directly to the central host computer unit through a hard-wired communication link. The printers may further be located in a climate controlled environment that is otherwise isolated from the rest of the LAN.

From time to time, it becomes necessary for a data-collection computer to communicate directly to a printer, rather than through the LAN. For example, a test batch configuration may be stored in memory within a data-collection computer and loaded directly into one or more printers to insure uniform print results (referred to as "cloning"). Alternatively, an operator of a data-collection computer in a large facility may wish to utilize a local printing station disposed in near proximity to a work location rather than returning to a central printing station adjacent to the central host computer. In these situations, the operator may opt to connect the data-collection computer to the printer using conventional printer cables having standard interface connectors, e.g., an RS-232 connector and the like.

Despite the advantages of coupling the data-collection computer to the printer, there are numerous operational difficulties that make such a connection impractical. First of all, the operator may not always be able to locate a suitable interface cable, and it is often time consuming and cumbersome to connect the cable to an interface panel of the printer. Repeated connection and disconnection of interface cables tends to weaken the connectors of the printer and data-collection computer, resulting in intermittent electrical connections.

Even more significant is the threat of harm to either of the printer or the data-collection computer due to effects such as electro-static discharge (ESD) or electromagnetic interference (EMI). ESD refers to sparks or electrons that jump from an electrically charged object to an approaching conductive object. EMI refers to electromagnetic waves that emanate from an electrical device, including both low-frequency waves from electro-mechanical devices and high-frequency waves (RFI) from electronic circuit chips and other electronic devices. Any ESD which results from the coupling of the interface cable between the printer and the data-collection computer can damage the delicate electronic circuitry of either of the two systems. Moreover, EMI from an unshielded or poorly shielded interface cable can interfere with the operation of the printer or the data-collection computer, resulting in further damage or degradation of system performance.

Accordingly, it would be desirable to provide a convenient method and apparatus to permit a printer to communicate with a handheld data-collection computer without requiring interface cables. Such a system would eliminate the inconvenience and risks associated with use of such interface cables.

SUMMARY OF THE INVENTION

In accordance with the teachings of the present invention, a data communication system is provided to permit a printer to communicate with a handheld data-collection computer as well as other elements of a wireless LAN. The data communication system provides a simple and convenient optical interface between the printer and the data-collection computer, while avoiding the need for interface cables to form a hardwired interface.

The data communication system comprises a printer having a receiving cavity disposed at an outer surface thereof. The receiving cavity has a first optical communication port disposed on at least one surface of the receiving cavity. The first optical communication port is coupled to the printer to permit data communications therewith. A data-collection computer has a second optical communication port disposed at an outer surface thereof. The second optical communication port is coupled to the computer to permit data communications therewith. The computer is adapted for partial insertion into the receiving cavity to bring the first optical communication port into partial alignment with the second optical communication port. Thereby, an optical medium formed between the first and second optical communication ports permits direct data communication between the printer and the computer. In addition, the data-collection computer provides a wireless interface for the printer permitting it to communicate directly with other remote elements of the wireless LAN.

More particularly, the receiving cavity further comprises a generally rectangular shape having oppositely disposed side walls and a bottom adjoining the side walls. The bottom provides the least one surface of the receiving cavity on which the first optical communication port is disposed. The receiving cavity further comprises a cover adapted for selective movement between closed and open positions. The data-collection computer further comprises a generally elongated rectangular shape having a bottom end providing the outer surface on which the second optical communication port is disposed.

The optical medium provides significantly improved electrical isolation between the printer and the data-collection computer. This isolation substantially reduces the possibility of ESD between the two system elements. Moreover, by eliminating the interface cable, a major source of undesirable EMI or RFI within the system is reduced accordingly. In an embodiment of the data communication system, the optical medium further comprises an infrared communication path.

A more complete understanding of the printer having an optical interface docking port for direct communication with a handheld data-collection computer will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 5 is a block diagram of the data-collection computer in communication with the printer through the optical interface.

DETAILED DESCRIPTION OF THE PREFERRED EMBODIMENT

The present invention satisfies the need for a convenient method and apparatus to permit a printer to communicate with a handheld data-collection computer without requiring interface cables. In the detailed description that follows, like element numerals are used to describe like elements illustrated in one or more of the figures.

Figure 1:
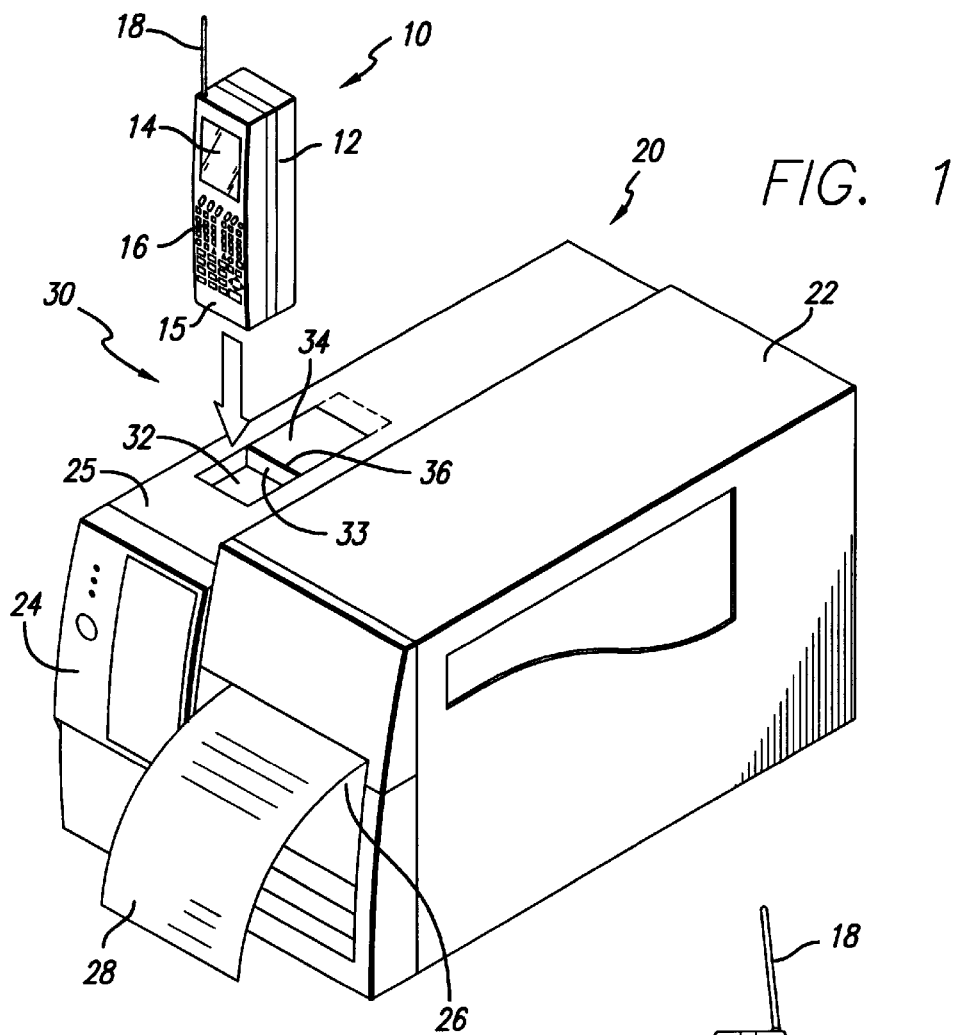
FIG. 1 is a perspective view of a handheld data-collection computer disposed adjacent to an optical docking station of a thermal printer.

Referring first to FIG. 1, a handheld data-collection computer 10 is illustrated in conjunction with a thermal printer 20. The data-collection computer 10 comprises a housing 12 having a generally elongated rectangular shape. The data-collection computer 10 further includes a keypad 16 and a display screen 14 disposed on a front facing surface of the housing 12. The data-collection computer 10 has an overall size and weight suitable to be held in an operator's hand, so that the operator can enter data and commands into the keypad 16 using the free hand. As will be further described below, the data-collection computer 10 is provided with substantial computer processing power, and is adapted to communicate with a LAN over an RF channel. An antenna 18 extends outwardly from a top surface of the housing 12 to permit the data-collection computer to transmit and receive RF signals to and from the LAN.

As known in the art, the data-collection computer 10 may be used to collect various types of data, such as data encoded in one or two-dimensional bar code symbols, and to communicate the collected data back to the other elements of the LAN. To perform the data-collection function, the computer 10 may further be adapted for attachment to a separate optical scanning device, such as a handheld scanner having a CCD element or articulating laser source. Such externally collected data would be electrically coupled into the data-collection computer 10 through an interface port having a conventional electrical connector (not shown). Alternatively, a scanning device may be integrally provided within the housing 12 of the data-collection computer 10. Such data collection systems are well known in the art.

The thermal printer 20 comprises a housing 22 which encloses the operative elements of the printer, such as a transport mechanism used to transport print media to a thermal print head. As known in the art, the transport mechanism may further include a platen driven by a motor to draw a web of the print media past the thermal print head. The print media web is paid out from a media supply roll stowed internally within the printer 20 by operation of the transport mechanism, and printed media 28 thus exits the printer housing 22 via a media exit opening 26 disposed at a front portion of the printer. It should be understood that further details of these conventional elements of a printer otherwise not pertinent to the discussion of the present invention are omitted for simplicity, but would necessarily be included in an actual printer. In a preferred embodiment of the invention, a thermal printer 20 is utilized since thermal printing techniques provide generally favorable results in printing bar code labels; however, it should be appreciated that the present invention would be equally applicable to other well known types of printers, such as laser, ink jet or impact printers.

A control panel 24 is disposed at a front surface of the printer housing 22, and has a plurality of buttons that control various operations of the printer. For example, the buttons may include a start/stop button that initiates/terminates printing operations, a reset button that clears the internal memory of the printer, and a test button that initiates a test procedure of the printer. It is anticipated that the printer 20 be connected in a hardwired manner through the LAN to a computer that provides printing commands to the printer. This way, an operator of the printer 20 may send a data file from the computer to the printer to be executed by printing a series of labels.

Figure 2:
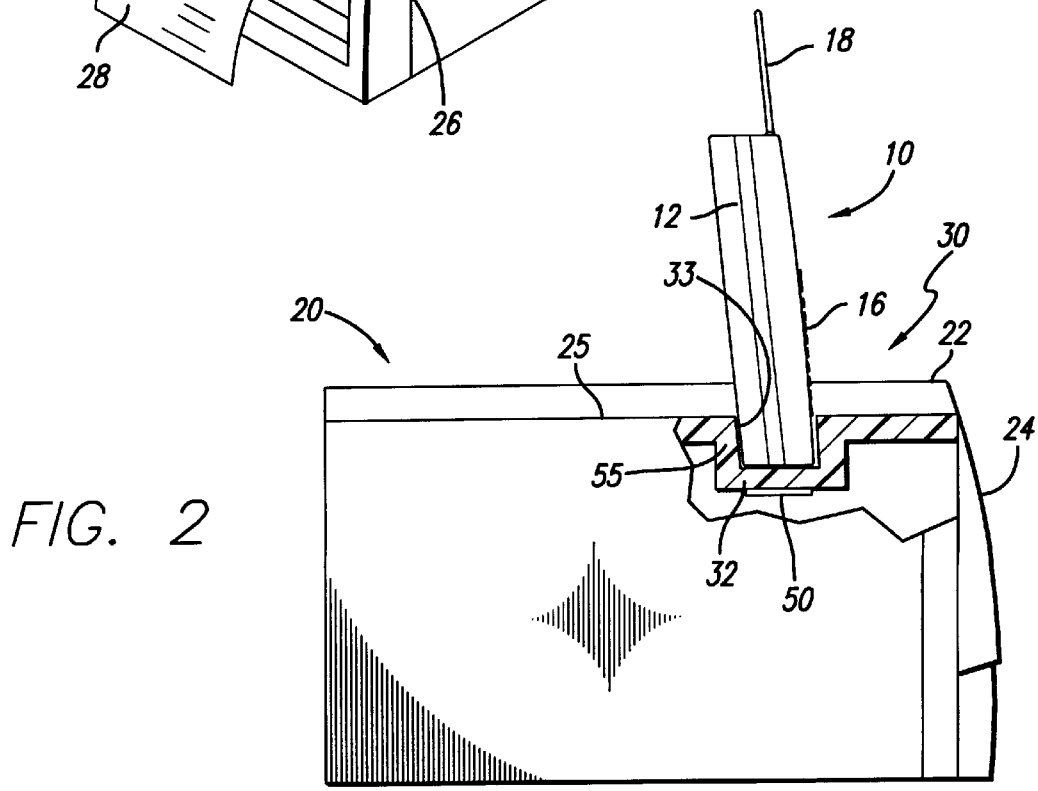
FIG. 2 is a side sectional view of the printer docking station with the data-collection computer engaged therein.

The thermal printer 20 further includes a docking station 30 disposed on an upper surface 25 of the printer housing 22. The docking station 30 comprises a receiving cavity having a generally rectangular shape defined by a lower surface 32 that abuts with four side surfaces 33. As illustrated in FIGS. 1 and 2, the bottom end 15 of the data-collection computer 10 may be inserted into the docking station 30 to form an optical communication link between the computer and the printer 20, as will be further described below. With the data-collection computer 10 inserted fully into the docking station 30, a major portion of the data-collection computer extends outwardly of the docking station so that the keypad 16 and display screen 14 remain visible and accessible to the operator for continued use of the data-collection computer. A slidable cover 34 having a handle 36 is provided in the upper surface 25 of the printer 20 to permit the docking station to be selectively opened to insert the data-collection computer 10 or closed to block access to the docking station. The cover 34 may be biased into a normally closed position by use of a spring. The cover 34 prevents dust or moisture from entering the receiving cavity when the docking station 30 is not in use.

Figure 3:
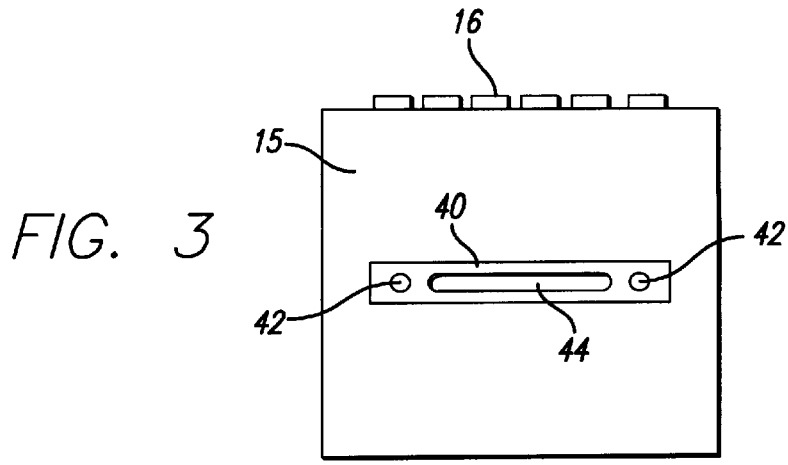
FIG. 3 is a bottom view of the data-collection computer.

Referring now to FIG. 3, the bottom end 15 of the data-collection computer 10 is illustrated. Substantially centered in the bottom end 15 is a computer communication port 40 that comprises data transmitting elements 42 and a data receiving element 44. The data transmitting elements 42 further comprise infrared light emitting sources, such as light emitting diodes (LEDs). The data receiving element 44 comprises an infrared light sensor, such as a photodiode. In the exemplary computer communication port 40, a pair of data transmitting elements 42 and a single data receiving element 44 are illustrated; however, it should be appreciated that any other number of such respective elements may be advantageously utilized in order to achieve effective performance. The computer communication port 40 may additionally be recessed into the bottom end 15 of the data-collection computer 10, or may be covered by a transparent cover (not shown), in order to protect the sensitive transmitting and receiving elements 42, 44 from undesirable impact through ordinary use of the computer.

Figure 4A:
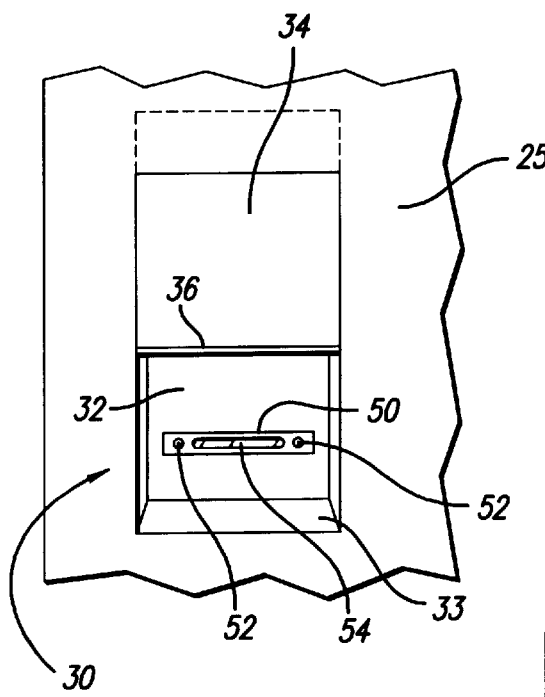
FIGS. 4A and 4B are top views of the printer showing the docking station in open and closed positions, respectively.
Figure 4B:
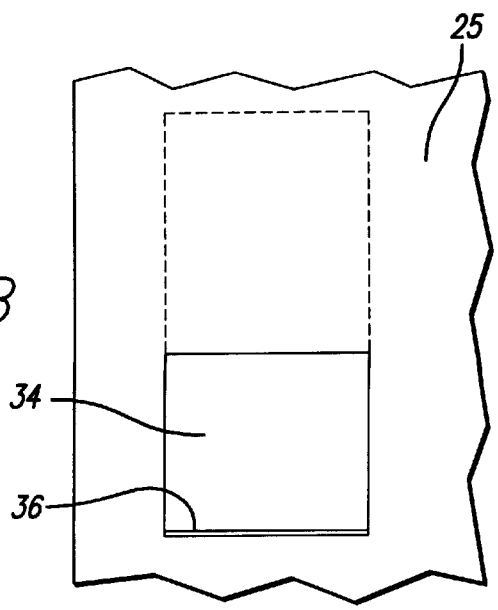

FIGS. 4A and 4B illustrate the docking station 30 of the printer 20 in open and closed positions, respectively. As shown in FIG. 4A, the lower surface 32 of the receiving cavity includes a printer communication port 50 that is substantially identical to the computer communication port 40 of the data-collection computer 10 described above. Particularly, the printer communication port 50 includes a pair of data transmitting elements 52 and a data receiving element 54. Like the computer communication port 40 described above, the optical communication port 50 may include a transparent cover or may be recessed to prevent damage due to impact caused by a forceful insertion of the data-collection computer 10 into the docking station 30.

The printer communication port 50 is substantially centered in the lower surface 32 so that it is in at least partial alignment with the computer communication port 40 when the data-collection computer 10 is inserted into the receiving cavity. It should be appreciated that perfect alignment between the communication ports 40, 50 is not absolutely necessary to achieve acceptable data communication due to the omnidirectional transmitting nature of infrared light. In fact, it is anticipated that acceptable data communication can be achieved by holding the data-collection computer 10 in a position above the docking station 30 with the cover 34 held open so that the optical fields of view of the communication ports 40, 50 are partially coincident. The docking station 30 may further include a ridge extending from the side surfaces 33 near the lower surface 32 to support the bottom end 15 of the data-collection computer 10. The ridge ensures formation of an acceptable gap between the communication ports 40, 50 which allows the optical fields of view of the communication ports to coincide while the data-collection computer 10 is within the docking station 30.

A block diagram of the data-collection computer 10 in communication with the printer 20 is shown in FIG. 5. The data-collection computer 10 includes a central processing unit (CPU) 62, a read only memory (ROM) 64, a random access memory (RAM) 66, an input/output (I/O) device 74, and a data input driver 72. Each of the functional elements of the data-collection computer 10 are coupled together by a bi-directional data and control bus 65, over which data and control messages are transmitted. The CPU 62 controls the operation of the data-collection computer 20, and may be provided by a conventional microprocessor, such as an Intel 80486 microprocessor. The RAM 66 provides temporary data storage for operation of the CPU 62, and the ROM 64 provides for non-volatile storage of an instruction set, i.e., software, that is executed in a sequential manner by the CPU to control the overall operation of the data-collection computer 20. The data input driver 72 processes input signals from the keyboard 16 as well as information signals from an external or internal scanning device. The display screen 14 is also coupled to the CPU 62 for display of information, as known in the art. The data-collection computer 10 may also be provided with other non-volatile memory storage devices, such as a disk drive memory system.

The I/O device 74 controls communications between the data-collection computer 10, and the LAN and the printer 20. The I/O device 74 is coupled to an RF driver 75 which includes a radio frequency (RF) modulator that permits digital signals to be communicated through the antenna 18 to/from the LAN via the RF communication channel. The I/O device 74 is also coupled to an infrared (IR) driver 76 for modulating/demodulating digital signals from/to the computer 10 on an infrared light medium. The IR driver 76 is coupled to an IR source 78 and an IR sensor 79 which provide the data transmitting elements 42 and data receiving element 44 of FIG. 3, respectively.

The printer 20 includes a CPU 82, a ROM 83, a RAM 84, an input/output (I/O) driver 88, a print head control unit 85, and a media transport control unit 86. Like the data-collection computer 10, each of the functional elements of the printer 20 are coupled together by a bi-directional data and control bus 87, over which data and control messages are transmitted. The CPU 82 controls the operation of the printer 20, and may be provided by a digital signal processor circuit. Since the printer 20 is a peripheral device that is commanded by an external processor, the amount of processing power of the CPU 82 need not be as great as the CPU 62 described above. The RAM 84 and ROM 83 provide similar functions as the corresponding elements of the data-collection computer 10. The media transport control unit 86 provides signals to the various motors of the transport mechanism that effect the transport of the print media through the printer 20. The print head control unit 85 provides signals to the thermal print head to control parameters such as activation timing, duration and temperature of the individual printing elements. The control panel 24 is also coupled to the CPU 82 through the bus 87 for communication of other control information.

The I/O device 88 is similar to the I/O device 74 described above, and controls communications between the printer 20 and the LAN and the data-collection computer 10. The I/O device 88 is coupled to a network driver 89 which is coupled directly to the LAN for communication of commands and data. The I/O device 74 is also coupled to an IR driver 92 for modulating/demodulating digital signals from/to the printer 20 on an infrared medium. The IR driver 92 is coupled to an IR source 94 and an IR sensor 93 which provide the data transmitting elements 52 and data receiving element 54 of FIG. 4A, respectively. As illustrated in FIG. 5, the IR source 78 of the data-collection computer 10 is adapted to transmit infrared signals to the IR sensor 93 of the printer 20, and the IR source 94 of the printer 20 is adapted to transmit infrared signals to the IR sensor 79 of the data-collection computer 10.

In ordinary operation, the data-collection computer 10 communicates with the LAN over the RF channel. When it is desired to communicate directly to the printer 20 from the data-collection computer 10, the operator opens the cover 34 and inserts the bottom end 15 of the computer into the docking station 30. The data-collection computer 10 then communicates with the printer 20 through the communication ports 40, 50. The data-collection computer 10 and the printer 20 may include a software protocol that automatically recognizes establishment of the optical communication channel to override communication with the LAN. Alternatively, the data-collection computer 10 and/or printer 20 may require manual entry of commands into the keypad 16 or control panel 24 in order to establish the optical communication channel. Once the optical communication channel is established, data files and commands may be sent from the data-collection computer 10 directly to the printer 20.

In addition, by docking the data-collection computer 10 with the printer 20, the printer is thereby provided with an RF communication interface to communicate with other remote devices within the wireless LAN. For example, other remote data-collection computers operating within the wireless LAN can communicate with the printer 20 using the docked data-collection computer 10 as an interface. As a result, these remote data-collection computers can control printing operations of the printer 20 via the RF communication link.

It should be appreciated that the optical communication link between the printer 20 and the data-collection computer 10 provides physical and electrical isolation between the devices. Since an electrical connection is not formed between the devices, the possibility of ESD is reduced substantially. By eliminating the interface cable between the data-collection computer 10 and the printer 20, a major source of undesirable EMI or RFI within the system is also reduced.

Moreover, it should also be appreciated that an optical communication link between the printer 20 and the data-collection computer 10 may also be established by holding the data-collection computer in proximity to the printer such that the respective IR sensors are within a line of sight of each other. In this mode of operation, the need to insert the data-collection computer 10 into the docking station 30 of the printer 20 is eliminated. A drawback of this mode is that any instability of the data-collection computer 10 due to movement by the operator can result in a break of the optical communication link with an associated loss of data or reduction in data rate.

Figure 6:
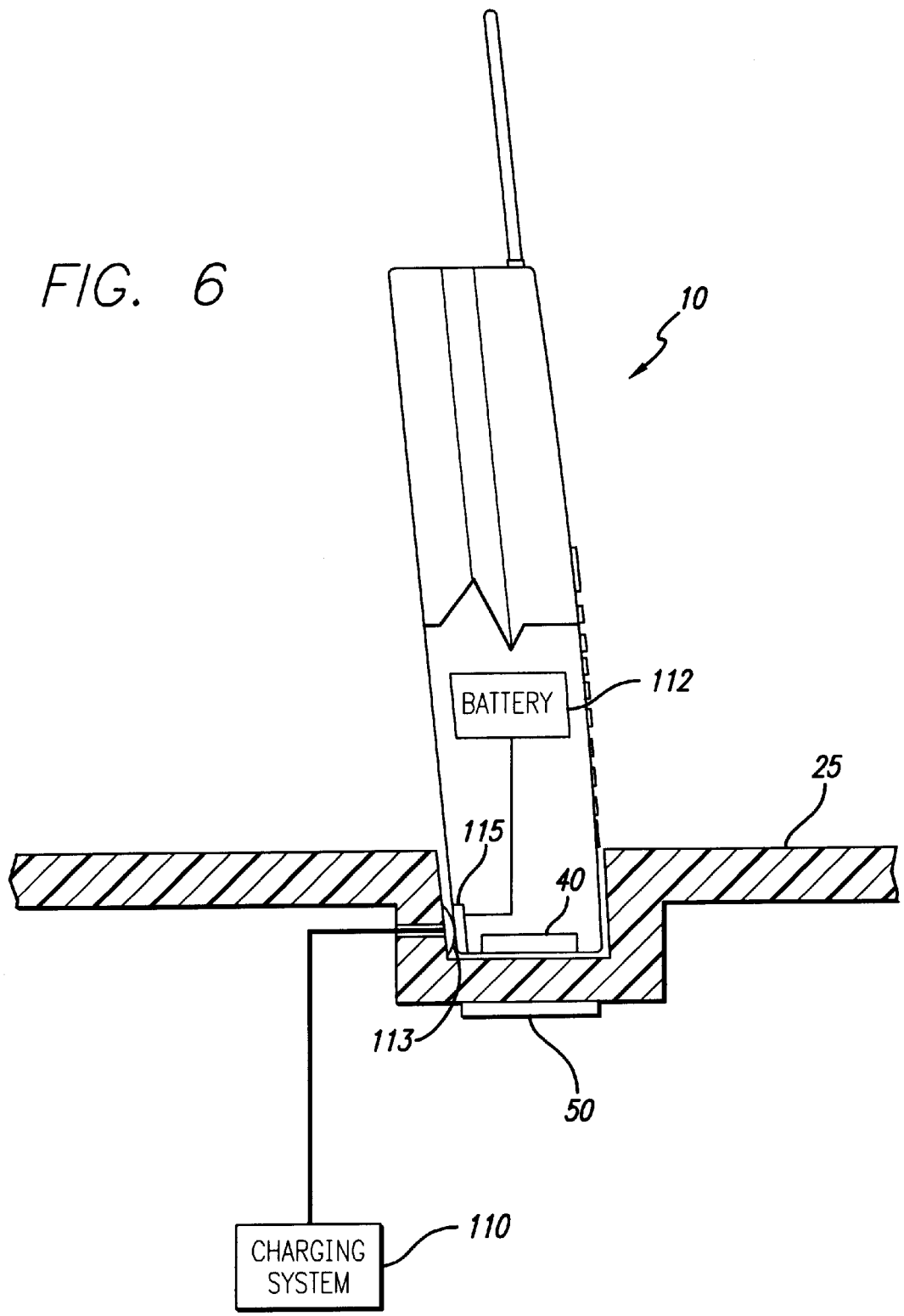
FIG. 6 is a partial side sectional view of an alternative embodiment of the printer docking station.

Referring now to FIG. 6, an alternative embodiment of the data communication system is illustrated. In this alternative embodiment, the docking station 30 is modified to include a pair of electrical contacts 113 on one of the side surfaces 33. The electrical contacts 113 are coupled to a charging system 110 provided in the printer 20. The data-collection computer 10 includes a corresponding pair of electrical contacts 115 that are coupled to a battery 112 provided in the computer. The battery 112 provides a power source for the data-collection computer 10. The electrical contacts 113 of the printer 20 may be comprised of curved metal strips to provide a spring bias against the electrical contacts 115 of the data-collection computer 10. With the data-collection computer 10 inserted into the docking station 30, the battery 112 is coupled to the charging system 110 through the electrical contacts 114, 115, so that the battery 112 can be recharged while the optical communication channel is established.

Having thus described a preferred embodiment of the data communication system, it should be apparent to those skilled in the art that certain advantages of the described system have been achieved. It should also be appreciated that various modifications, adaptations, and alternative embodiments thereof may be made within the scope and spirit of the present invention. The invention is further defined by the following claims.

What is claimed is:

1. A data communication system, comprising:
   a fixed position printer coupled via wires to a local area network, said printer having a receiving cavity disposed at an outer surface thereof, said receiving cavity further including a first optical communication port disposed on at least one surface of said receiving cavity, said first optical communication port being coupled to the printer to permit data communications therewith; and
   a handheld computer having a second optical communication port disposed at an outer surface thereof, and an RF communication port enabling said computer to communicate via a wireless connection to said local area network, said second optical communication port being coupled to said computer to permit data communications therewith, said computer being adapted for partial insertion into said receiving cavity to bring said first optical communication port into at least partial alignment with said second optical communication port enabling data communication over an optical medium between said first and second optical communication ports, thereby permitting direct data communication between said printer and said computer.
   wherein said RF communication port permits wireless communication between said printer and said local area network only when said computer is inserted in said receiving cavity.

2. The data communication system of claim 1, wherein said receiving cavity further comprises a generally rectangular shape having oppositely disposed side walls and a bottom adjoining said side walls, said bottom providing said at least one surface of said receiving cavity.

3. The data communication system of claim 1, wherein said receiving cavity further comprises a cover adapted for selective movement between closed and open positions.

4. The data communication system of claim 1, wherein said computer further comprises a generally elongated rectangular shape having a bottom end providing said outer surface on which said second optical communication port is disposed.

5. The data communication system of claim 1, wherein said optical medium further comprises infrared light.

6. The data communication system of claim 1, wherein said receiving cavity is disposed on an upper surface of said printer.

7. The data communication system of claim 1, wherein said receiving cavity further comprises means for charging a battery of said computer while said computer is inserted into said receiving cavity.

8. The data communication system of claim 1 wherein said receiving cavity is oriented such that said handheld computer is retained therein by gravity.

9. A data communication system, comprising:

a fixed position printer coupled via wires to a local area network, said printer having a first optical communication port disposed at an external surface thereof, said first optical communication port being electrically coupled to the printer to permit data communications therewith; and a handheld data-collection device having a second optical communication port disposed at an external surface thereof, and a supplemental communication port enabling wireless communication with said local area network, said second optical communication port being electrically coupled to said data-collection device to permit data communications therewith, wherein an optical communication link is established between said first optical communication port and said second optical communication port, said supplemental communication port thereby permitting wireless communication between said printer and said local area network via said data-collection device only when said first and second optical communication ports have said optical communication link.

10. The data communication system of claim 9, wherein said supplemental communication port further comprises an RF communication port.

11. The data communication system of claim 9, wherein said optical communication link further comprises infrared light.

12. The data communication system of claim 9, wherein said printer further comprises a receiving cavity disposed at an outer surface thereof, said receiving cavity further including said first optical communication port.

13. The data communication system of claim 12, wherein said data-collection device is adapted for partial insertion into said receiving cavity to bring said first optical communication port into at least partial alignment with said second optical communication port.

14. The data communication system of claim 12, wherein said receiving cavity further comprises a generally rectangular shape having oppositely disposed side walls and a bottom adjoining said side walls.

15. The data communication system of claim 12, wherein said receiving cavity further comprises a cover adapted for selective movement between closed and open positions.

16. The data communication system of claim 15, wherein said cover is biased in a normally closed position.

17. The data communication system of claim 9, wherein said data-collection device further comprises a generally elongated rectangular shape having a bottom end providing said outer surface on which said second optical communication port is disposed.

18. The data communication system of claim 12, wherein said receiving cavity further comprises means for charging a battery of said data-collection device while said data-collection device is inserted into said receiving cavity.

19. The data communication system of claim 9, wherein said printer further comprises a thermal printer.

* * * * *